(12) United States Patent
Williams

(10) Patent No.: US 8,305,239 B2
(45) Date of Patent: Nov. 6, 2012

(54) SERVICE ACCESS METHOD AND APPARATUS

(75) Inventor: Roland E. Williams, Martinez, CA (US)

(73) Assignee: Zi Corporation of Canada, Inc., Calgary (CA)

( * ) Notice: Subject to any disclaimer, the term of this patent is extended or adjusted under 35 U.S.C. 154(b) by 1206 days.

(21) Appl. No.: 12/123,120

(22) Filed: May 19, 2008

(65) Prior Publication Data

US 2008/0288665 A1   Nov. 20, 2008

Related U.S. Application Data

(60) Provisional application No. 60/938,579, filed on May 17, 2007.

(51) Int. Cl.
*H03M 11/00* (2006.01)

(52) U.S. Cl. ............... 341/22; 379/355.09; 715/812; 709/218

(58) Field of Classification Search .............. 341/20–22; 379/355.09; 715/812; 709/218
See application file for complete search history.

(56) References Cited

U.S. PATENT DOCUMENTS

| | | | |
|---|---|---|---|
| 5,491,745 A | 2/1996 | Roeder | |
| 7,681,145 B1 * | 3/2010 | Pu | ............... 715/812 |
| 7,890,886 B2 * | 2/2011 | Matthews et al. | ............. 715/809 |
| 8,132,118 B2 * | 3/2012 | Danker et al. | ................ 715/780 |
| 2003/0162540 A1 | 8/2003 | Nielsen | |
| 2005/0071777 A1 * | 3/2005 | Roessler et al. | ............. 715/810 |
| 2005/0107111 A1 | 5/2005 | Ji | |
| 2006/0019717 A1 | 1/2006 | Gong | |
| 2006/0171525 A1 | 8/2006 | Kusaka et al. | |

OTHER PUBLICATIONS

International Search Report and Written Opinion for PCT/US2008/064097, Sep. 26, 2008, Zi Corporation of Canada, Inc. et al.

* cited by examiner

*Primary Examiner* — Albert Wong
(74) *Attorney, Agent, or Firm* — Michael A. Glenn; Glenn Patent Group

(57) ABSTRACT

The invention may be embodied as a method of selecting a service and inputting information to that service. In one such method, an input device having keys is provided. When such a key is pressed and released quickly, the user indicates a desire to enter a symbol on the key in order to enter symbols of an entry string. In addition, one or more of the keys may also be used to identify a service and also supply that service with the entry string. For example, by pressing and holding such a key, the entry string may be delimited and then sent to a service corresponding to the pressed key. In this manner, a single key press may be used to both delimit an entry string and also send the entry string to the service. The service may use the delimited entry string to retrieve information, which is then supplied to the input device.

8 Claims, 2 Drawing Sheets

SERVICE ACCESS METHOD AND APPARATUS

CROSS-REFERENCE TO RELATED APPLICATION

This application claims the benefit of priority to U.S. provisional patent application Ser. No. 60/938,579, filed on May 17, 2007.

FIELD OF THE INVENTION

The present invention relates to devices and methods of assisting people with obtaining information. In particular, the invention may make it easier for people to obtain information via a mobile appliance, such as a cellular telephone.

BACKGROUND OF THE INVENTION

Mobile personal communication appliances are commonplace. In general, numbers are entered and used to dial a phone number or used as an address or short code to access certain services. Phone numbers that are used frequently are often stored on the appliance (i.e. "locally") so that they may be easily retrieved and then dialed without entering the entire number. In this manner, fewer key-presses may be used to identify a desired phone number. For example, if the user's office phone number is "848-1510", then upon pressing the number "8" followed by the number "4", the entire phone number 848-1510 may be displayed to the user for selection. If the user selects the displayed number, then the number is dialed automatically by the appliance.

In most modern cell phones, a common feature is that a limited number of telephone numbers may be stored in locations that are paired with some of the keys on the keypad so that when a particular key is pressed and held for a period of time—colloquially a "long key-press"—the corresponding telephone number may be recalled, along with other relevant data if present, and a call initiated to that stored number without further action by the user. For example, it is possible to program a cell phone such that pressing and holding the key corresponding to the letter "s" will retrieve the phone number for the user's secretary, and may even dial the secretary's phone number without further key presses.

Another routine use for a long key-press arises when the multi-tap method of text entry is employed on an appliance. In the multi-tap method, one or more of the keys on the appliance are each assigned several symbols, and the user identifies which of the symbols corresponding to a particular key is desired by pressing the key one or more times in quick succession, until the number of times the key is pressed corresponds to the symbol desired by the user. For example, if a key is assigned to allow the user to identify the characters "a", "b", "c" or "2", and the user desires to identify the letter "b", then the key may be pressed twice in quick succession, since "b" is the second character identified on the key. Also in a standard multi-tap configuration, a long key-press may indicate the user's desire to enter the numeric assignment of the key rather than a non-numeric symbol corresponding to the key.

In some prior art systems, if an ambiguous entry is made using the keys of a standard telephone keypad, then a system according to the prior art would present the user with a numeric string corresponding to the pressed keys, and may also present the user with non-numeric strings corresponding to the pressed keys. Further, in accordance with the prior art, the appliance may display items related to the string—such items may include icons for software applications or abstracts. The user must then move a cursor to the desired object on the screen and press the "enter" key to select that object.

In a product offered by the Zi Corporation of Calgary, Alberta, Canada called "Qix", a user is able to retrieve information related to the entered sequence of keys. It should be noted that Qix uses an "active idle screen" technology to reduce click distance (defined below). As such, the entered sequence of keys may be used to identify strings and corresponding uses of those strings that may be desired by the user. The strings may be provided to the user for selection, for example, by moving a cursor to a desired one of the strings and selecting that string. In the Qix product, strings may be identified to the user as a telephone number and once selected, the number is dialed. Strings also may be identified as a proxy for a telephone number or related to an internal function of the appliance. Also, selecting a string may invoke a program and the entered string or its related data may sometimes be used as a parameter for further work. One drawback to such a system is that a particular series of characters may have multiple uses. As such, the same series of characters may need to be listed more than once, each listing corresponding to a different potential use. Since the screen on a mobile appliance that is used to display information is small, multiple listings of the same characters occupy valuable space. In addition, multiple listings of the same characters require the user to move the cursor through the multiple listings, which can detract from the user's ability to quickly identify desired information and uses of that information.

SUMMARY OF THE INVENTION

The invention may be embodied as a method of selecting a service and inputting information to that service. In one such method, an input device having keys is provided. One or more of the keys of the input device may each be used to enter more than one symbol (i.e. they may be polysemous), such as a letter or a number. When such a key is pressed and released quickly, the user indicates a desire to enter one of the symbols on the key in order to enter symbols of an entry string. In another method according to the invention, the keys are not polysemous.

One or more of the keys may also be used to identify a service and also supply that service with the entry string. For example, by pressing and holding such a key, the entry string may be delimited and then sent to a service corresponding to the pressed key. In this manner, a single key press may be used to both delimit an entry string and also send the entry string to the service.

In one such service, information may be stored in a database for retrieval. Upon receiving an entry string from the input device, the service may search the database to determine whether the entry string matches any of the information in the database. Upon finding information that matches the entry string, the service may return the information to the input device so that the returned information may be provided to the user of the input device. As such, the user is able to receive information resulting from operations performed by the service using the entered string.

In one embodiment of the invention, strings corresponding to the entered symbols are displayed for selection by the user. The displayed strings may be presented in an ordered list to the user via a monitor. As the user presses keys to augment the string, the number of displayed strings may be reduced, thereby bringing the number of choices within a reasonable number. A cursor may be used to identify one of the displayed strings. In this manner, it may be possible for the user to identify a longer string by pressing keys corresponding to only some of the symbols that make up the desired string. Then upon pressing and holding one of the keys on the input device, the identified string is not only delimited, but also is sent to a service corresponding to the key that was pressed and held. It should be noted that the service may be remote from the input device, and that many such services may be identified using an equal number of keys of the input device.

The invention may be embodied as an information system. In one such information system there may be an appliance having (a) keys used to enter an input string, and (b) at least one key which when pressed in a predefined manner will cause the input string to be delimited and also sent to a service provider computer identified by that key. The key which is used to delimit and send a string also may be used to enter symbols of the string, and the difference between entering a symbol and delimiting/sending the string may be in how the key is pressed. In a preferred embodiment of the invention, the appliance is programmed to interpret a quick press-and-release of the key as a desire to identify a symbol, but if the key is pressed but not quickly released, then the appliance will interpret this action as a desire to delimit and send the string.

The system may also include a service provider computer having software running thereon. The software may instruct the computer to (a) receive the delimited input string, (b) search a database for matches, and (c) upon identifying a match, the service provider computer will send the match to the appliance for display to a user. In one embodiment of such a system the predefined manner is to press and hold the key for a period of time that is longer than the period of time needed to enter a symbol.

It will be recognized that although it is known to use a dedicated key for indicating a user's desire to send data, the invention may be employed to allow the symbol-entry keys to serve also to delimit a string and select a service for acting upon the entered string. In this manner the symbol entry keys may be given more functionality, a dedicated key for sending data may be used less, and use of a handheld appliance may be facilitated.

BRIEF DESCRIPTION OF THE DRAWINGS

For a fuller understanding of the nature and objects of the invention, reference should be made to the accompanying drawings and the subsequent description. Briefly, the drawings are.

FURTHER DESCRIPTION OF THE INVENTION

Figure 1:
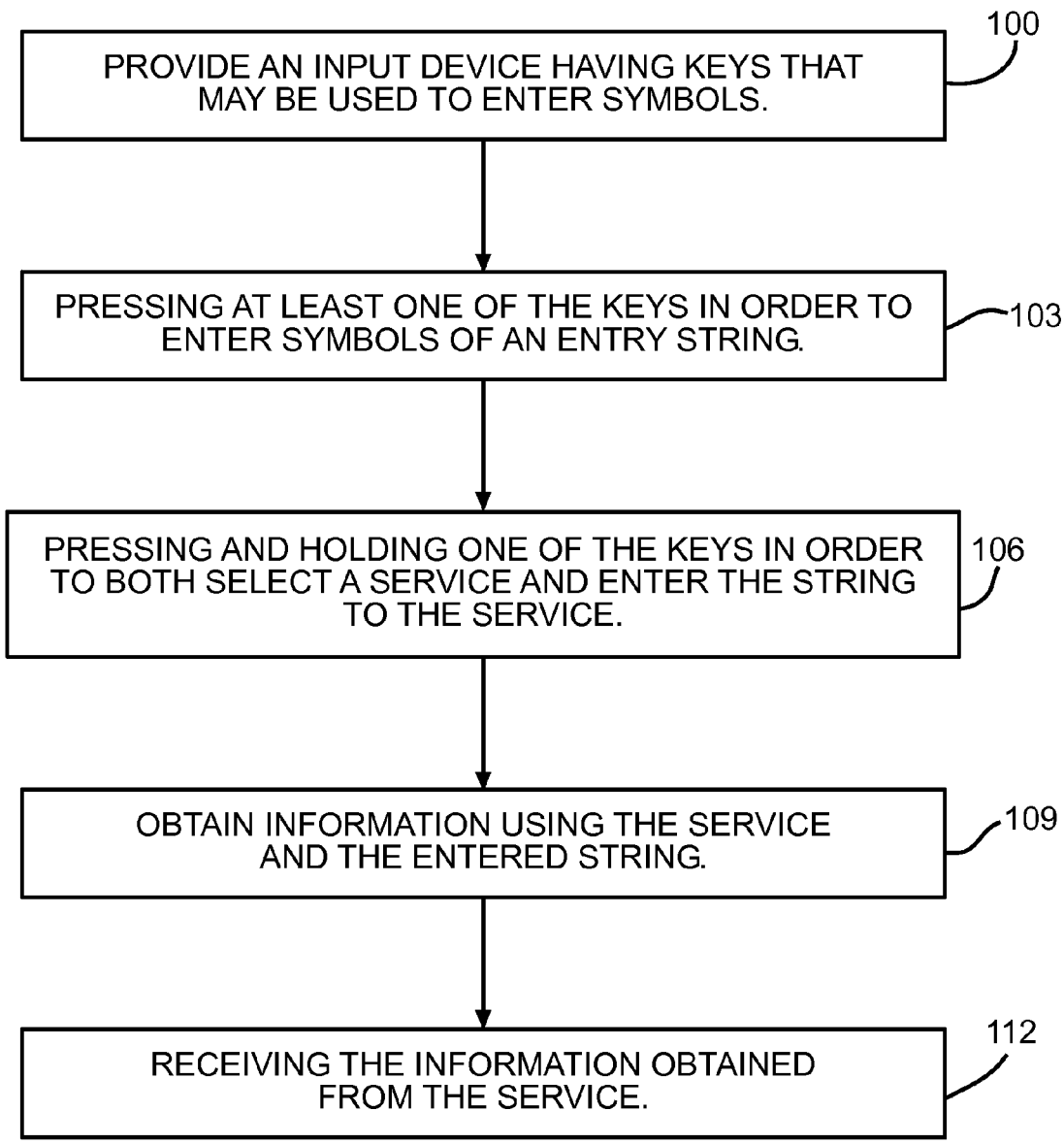
FIG. 1 is a flow chart showing a method according to the invention.

FIG. 1 depicts a method that is in keeping with the invention. An input device may be provided 100. The input device may have keys that may be used to enter symbols. At least one of the keys may be pressed 103 in order to enter symbols of an entry string. Then, by pressing 106 one of the keys in a manner that is different from that which was used to enter the symbols, the entry string is delimited and sent to a service that corresponds to the key that was pressed in the different manner. Using the delimited string, the service obtains 109 information that may be useful to the user. The information obtained via the service is then sent to and received by 112 the input device for use by the user.

The present invention may be embodied to use a long key-press, provided after input of a sequence of keys, to initiate an action. The sequence of keys (a "string") preceding the long key-press is used by the initiated action. For example, the long key-press may invoke a supporting program that requires a string as input in order to properly execute the action. In this manner, the program may cause the appliance to execute a series of semi-autonomous actions without halting to prompt the user for an input.

In contrast to the prior art systems, instead of using the long key-press to recall a string, the long key-press is used to initiate an action that utilizes a string identified by the key-presses that preceded the long key-press. The present invention greatly simplifies user action by reducing the click-distance that a user is from an outcome. The "click-distance" is a measure of goodness in user-interface parlance that refers to the number of key presses that a user must make before getting a particular result.

The invention may be used in a mobile appliance having the ability to exchange data with a network, which may be a wireless network. A purpose of the invention may be to reduce the user's workload and facilitate the use of a service. The user's workload may be reduced by invoking an appropriate environment without explicit user instruction.

To illustrate an embodiment of the invention, it may be useful to assume that the user of the mobile appliance intends to enter information from the idle screen. The "idle screen" is that condition of the mobile appliance that the appliance normally occupies in its resting or idle state. From the idle screen, the user presses keys in order to identify a string. The key-presses may unambiguously identify a desired string, or may ambiguously identify more than one string.

The key-presses may be made by using a keypad on the appliance, which may be a virtual keypad displayed on a touch-sensitive monitor. For example on a virtual keypad, the user may be permitted to replicate the actions he might take on a physical keypad by pressing locations on the touch-sensitive monitor that are indicated to correspond to the desired keys.

The user enters key-presses that are intended to identify a string desired by the user. The key-presses made by the user may be interpreted to indicate a number (such as a phone number) and interpreted to indicate some other type of string, for example a series of letters, or some combination of letters and other characters (including numbers).

The appliance may resolve the key-presses as each key-press is made, and may display to the user possible strings that the user may be trying to identify. If a long key-press is received that has an assigned meaning, then this long key-press may be treated as a delimiter of the string, and the string may be stored for use in the context designated by the long key-press. Upon making the long key-press, a program may be invoked that utilizes the stored string. For example, the stored string may be passed to an external service or locally executed program that is identified by the long key-press. This transaction may be terminated upon completion of the transmission of the stored string. In another embodiment, the invoked program may remain active, as in the case of a browser awaiting response.

The information comprised by the stored string may be received by a receiving service. Other data may also be received that identifies the sending appliance and the requested service. Yet more information may be made available that identifies the user's location or customary use of the service. It is anticipated that when more information is provided to a service, the service is more likely to provide a response to the user that is valuable.

The receiving service then processes the received string so as to resolve the enquiry. By way of example, consider that if the enquiry is a yellow pages enquiry, then the receiving service attempts to match the received data to at least one unambiguous meaning by comparing the received information to the service index or to its subcategories. If the data cannot be resolved unambiguously, then the receiving service may resolve the data ambiguously to more than a single meaning, and will create an ordered list responsive to the submitted information so that the list may be provided to the user in a format that is more likely to be useful to the user.

Once the response to the user has been created, the receiving service may pass the information to a transmitting service that may send a message to the originating appliance. In one embodiment, this message may contain the response information. In another embodiment, this message may contain information that enables a user to form a connection to a location where the information may be accessed. If the response is short, then a Short Message Service ("SMS") transmission may be sufficient to communicate the information. For example a single address and a telephone number may be handled in this way.

A more complicated response having a plurality of possible choices may be better provided by sending an address link to the originating appliance that would enable a user to invoke a browser or viewer application program directed to that address. It should be evident that this action of invoking a browser or viewer pointed correctly to the information may also be achieved automatically without user intervention.

Information may be made available by displaying the information visually or by other means that enables the user to select or otherwise act upon the information. For example if the information is displayed visually, a user may simply move a cursor to select the desired action. For example, selecting a telephone number may allow a call to be placed. Selecting an address might allow a browser to be invoked so as to browse a web site, or if the address is a physical address might enable the address to be entered into a navigation aid in order to locate a map of the area surrounding the address. The information may also be stored and acted upon at another time by the user.

As an example, consider the use of the yellow pages from a telephone book. When a user wishes to find a tradesman to provide a particular service, a user might first open a telephone book to the section having yellow colored pages. So if a user sought a plumber to fix a leaking toilet, then the yellow page section having a listing of plumbers would be opened. It is not unusual to find the yellow page index categorization difficult to use, and a user might end up in the section of the yellow pages labeled "Plumbing Contractors", within which a bewildering number of plumbing related services might be discovered, and none of which would be useful in locating a plumber willing to fix a leaking toilet. Once the proper section of the yellow pages is located, a user might then browse the listings, choose a provider (plumber), and finally call the listed telephone number to inquire about when the plumber can fix the toilet.

In a typical computer-based system, the user would generally invoke a browser program that allows the entry of a text string and interactively search a remote database for a listing that appears relevant to something sought by the user (e.g. the identity of a plumber willing to fix a leaking toilet). This multiple task exchange for data is sufficiently inconvenient that such applications have not proven popular with users of mobile appliances. The time and effort needed to use a mobile appliance to search a remote database is simply too much for most mobile appliance users. The present invention attempts to resolve at least some of that problem by reducing the user's task load by shortening the click-distance.

Instead of having to work through a menu list on the appliance and then invoke various programs before starting such a search, the user simply enters the sequence 7,5,8,6,2,3,7 (the symbols typically affixed to these digit keys spell "plumber") and then post-fixes a long key-press on a pre-arranged key. This post-fixed long key-press might be interpreted in the context of that pre-arranged key's meaning. For this example we might use the long-press of the "9" key to indicate the user's desire to access the Yellow Pages Directory. A manufacturer of the appliance might choose to label the "9" key so that the "y" appears as a yellow color, and thereby assist the user in remembering that a long-press of the "9" key may be used to access the Yellow Pages Directory.

It should now be apparent that whereas in the Qix application the appliance provides details of internal matches to an entered digit sequence, the method employed by the present invention uses the post-fixed entry of a long key-press to not only delimit the string, but also indicate how that string should be subsequently used.

So, to continue the example, entering 75869 (where 9 indicates a key-press held for some extended period of time—more than just a normal time required to enter the number and typically in the neighborhood of about half a second) might mean "form an inquiry of a Yellow Pages Directory, indexing letter combinations matching the foregoing digits 7586". In practice this might mean any ambiguous sequence matching the directory listings in a typical yellow pages list. Corresponding to this we might find multiple matches related to plumbing, nothing under slum . . . although slumber might be found as a cross index for sleep categories, and nothing under plun (the underlined-italicized text being text that corresponds to the key-presses entered by the user prior to the long key-press). The entry of a long key-press delimits this as the search term to be used in the application or context defined by that long pressed key.

In a limited index, such as found in a typical yellow pages listing set, the ambiguous range is likely to be relatively small. By this we mean that categories are uniquely identified by entering only a few key-presses prior to the long key-press, and so fewer keys are needed by comparison with standard English to produce useful results. In a limited index, the chances of identifying more than one index category based on the initial few letters is relatively small but, more importantly if more than one category is identified, the user can easily select from the limited number of identified categories that are ultimately displayed for user selection.

Once a sequence is terminated by a long key-press having some auxiliary meaning that is other than an ambiguity due to its legended symbols, then the necessary processes can be invoked within the appliance so as to allow subsequent interaction by the user. At least the transmission of the entered sequence must occur followed by the reception and handling of the inquiry response.

It should be understood that the invention is not limited to use in locating information in a telephone directory. The invention may be employed to assist users with finding information generally. For example, the invention may be employed to find information that is available via the Internet. To illustrate one such implementation, to find information via the search engine Google, a key on a cell phone might be used to indicate one of "4", "g", "h" or "i" (as is commonly done on cell phones), but the "g" might be stylized differently from the other symbols to remind the user that this key may be used to enter the string as a query on Google. For example, the "g" might be styled to resemble the capital letter used in the Google name, or the entire key might be distinctly styled so that the user might be guided to utilize Google's search engine.

Figure 2:
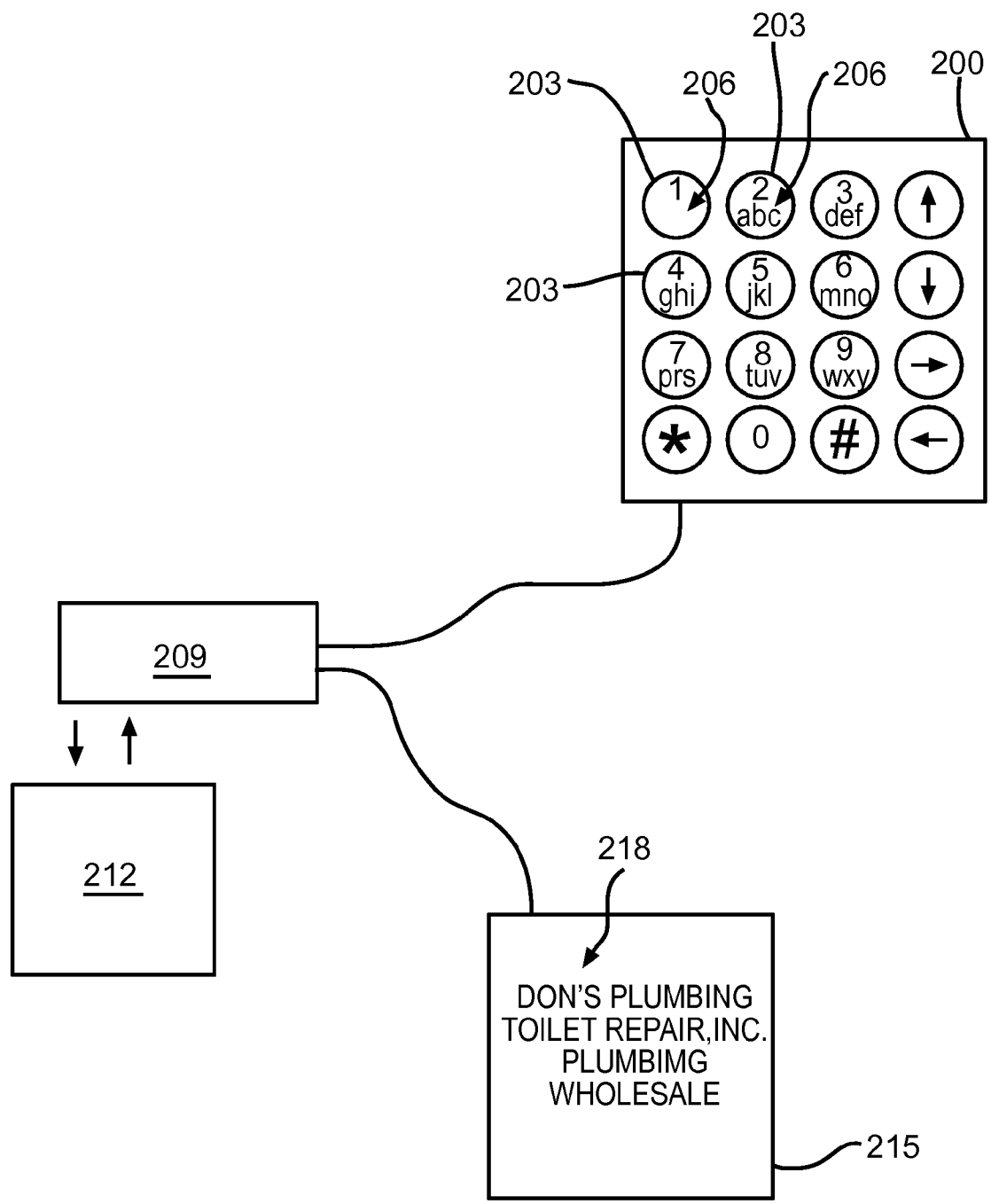
FIG. 2 is a schematic showing a system according to the invention.

It will now be recognized that a system for executing the method may include a number of components. FIG. 2 depicts some of these components. In FIG. 2 there is shown an input device 200 having keys 203, each with at least one symbol 206 displayed thereon. These keys 203 may be pressed in order to enter symbols 206 to a microprocessor 209. When the user believes he has entered enough symbols 206, one of the keys 203 may be pressed and held down longer than was necessary to enter a symbol 206. In doing so, the microprocessor 209 recognizes the key press not as a desire to enter a symbol, but instead as a desire to delimit the previously entered symbols as a string and send that string to a service corresponding to the key that was pressed in a manner to indicate the desire to delimit the string. The delimited string is then sent to a computer 212 of the service provider, where the string is used to identify information that may be desired by the user of the input device. The identified information may be sent back to the microprocessor 209, which may send the information to a monitor 215. FIG. 2 shows that the monitor 215 may display the identified information 218 in a format that is selectable by the user. The monitor 215 may also be used to display symbols of strings that the user may be trying to identify. The input device 200, microprocessor 209 and monitor 215 may be coupled together to form an appliance, such as a cellular telephone.

An appliance operating according to the invention may handle local matches automatically as the digits are entered, and display local matches to the user for selection. The long key-press may be considered by the appliance to mean that the user intends to identify a non-local service. In this simple example, the long key-press might indicate the user's desire to send a message via SMS transmission to a non-local service and wait for a response from that service. Alternatively, a long key-press may be interpreted to cause a browser session to be invoked that connects to a remote server related to that service which received the inquiry.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A method of selecting a service and inputting information to that service comprising:
   providing an input device having keys, each of which may be used to enter more than one symbol;
   pressing a sequence of the keys to enter symbols of an entry string ambiguously;
   pressing and holding one of the keys to both select a service and enter the string to the service; and
   receiving the information from the service, the information resulting from operations performed by the service using the ambiguously entered string.

2. The method of claim 1, wherein information corresponding to the string has been previously stored away from the input device for retrieval.

3. The method of claim 1, wherein the input device is able to store and provide strings for selection by the user.

4. The method of claim 3, further comprising displaying strings that were previously stored, and which correspond to the entered symbols.

5. The method of claim 4, wherein the displayed strings are arranged in an ordered list.

6. The method of claim 4, further comprising moving a cursor to identify a desired one of the strings.

7. The method of claim 1, wherein the entered string and selected service are sent from the input device to a computer having the service running thereon.

8. The method of claim 1, wherein at least one of the keys includes a distinctive feature not found on other keys to assist the user with identifying a preferred service.

* * * * *